United States Patent [19]

Demarle

[11] Patent Number: 4,705,660
[45] Date of Patent: Nov. 10, 1987

[54] METHOD AND APPARATUS FOR PRODUCING A PIPE OF FIBER-REINFORCED, HARDENABLE SYNTHETIC RESIN

[76] Inventor: Robert Demarle, 9373 St. Paul, Karnten, Austria

[21] Appl. No.: 723,493

[22] Filed: Apr. 11, 1985

[51] Int. Cl.$^4$ ............................................. B29C 41/04
[52] U.S. Cl. .................................... 264/108; 264/114; 264/209.2; 264/311; 425/292; 425/305.1; 425/310; 425/402; 425/435
[58] Field of Search ............... 264/108, 311, 112, 113, 264/209.2, 209.6, DIG. 65, 6–8, 114; 425/435, 305.1, 402, 515, 292, 310

[56] References Cited

U.S. PATENT DOCUMENTS

| | | | |
|---|---|---|---|
| 2,993,235 | 7/1961 | Brown et al. | 264/311 |
| 3,150,219 | 9/1964 | Schmidt | 264/258 |
| 3,475,532 | 10/1969 | Guldenfels et al. | 264/310 |
| 3,506,752 | 4/1970 | Varnell et al. | 264/311 |
| 3,679,337 | 7/1972 | Fuselier | 425/435 |
| 3,700,764 | 10/1972 | Tago | 264/311 |
| 3,714,312 | 1/1973 | Nitta et al. | 264/311 |
| 3,768,943 | 10/1973 | Maihart | 425/435 |
| 4,448,742 | 5/1984 | Kromrey | 264/311 |

FOREIGN PATENT DOCUMENTS

| | | |
|---|---|---|
| 1296785 | 6/1969 | Fed. Rep. of Germany . |
| 1704925 | 7/1971 | Fed. Rep. of Germany . |
| 2109643 | 9/1971 | Fed. Rep. of Germany . |
| 2018814 | 3/1972 | Fed. Rep. of Germany . |
| 2726499 | 1/1978 | Fed. Rep. of Germany . |
| 3133091 | 3/1983 | Fed. Rep. of Germany . |
| 2310517 | 12/1976 | France . |
| 50-27501 | 9/1975 | Japan ................................. 264/311 |
| 50-29943 | 9/1975 | Japan ................................. 264/311 |
| 623908 | 6/1981 | Sweden . |
| 623909 | 6/1981 | Sweden . |

Primary Examiner—Jeffery Thurlow
Attorney, Agent, or Firm—Young & Thompson

[57] ABSTRACT

To produce a pipe in a centrifugal molding process in a rotating mold, axially parallel oriented fibers are fed in parallel to the axis of the mold, decelerated in the mold, and accelerated, without a change in their orientation, transversely to their feeding direction. A device for performing this process comprises a chamber (3) which can be introduced into a rotating mold (14) and has an outlet opening (10) for cut fibers. In the chamber (3), a rotatable vane (5) is provided which is connected a disk (9) oriented transversely to the axis of rotation (8) of the vane, this disk lying in opposition to the feed conduit (1) for fiber material (2) terminating in the chamber (3). The surfaces of the vane are parallel to its axis of rotation, and so the orientation of the fibers parallel to that axis is maintained.

8 Claims, 2 Drawing Figures

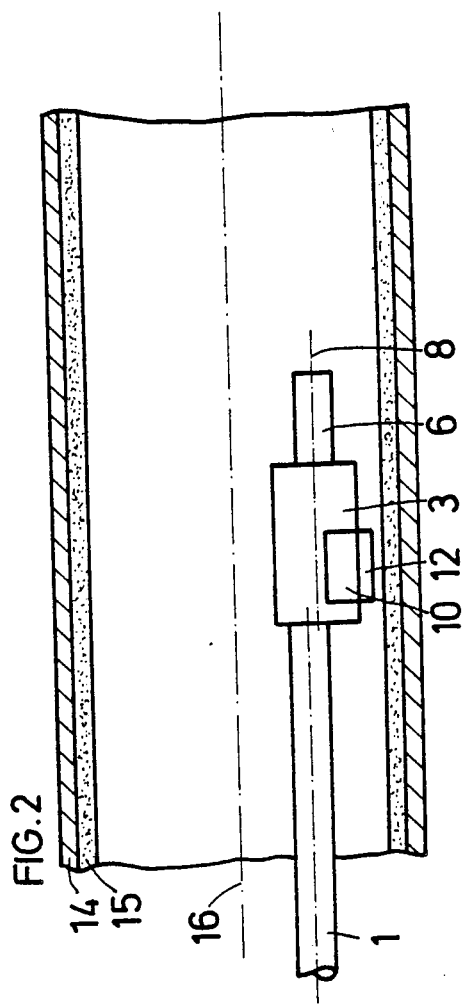

METHOD AND APPARATUS FOR PRODUCING A PIPE OF FIBER-REINFORCED, HARDENABLE SYNTHETIC RESIN

The invention relates to a method and apparatus for making pipe of fiber-reinforced, hardenable synthetic resin wherein cut fibers, especially cut glass roving, are contained as the fiber reinforcement in the hardenable synthetic resin, and wherein the pipe comprises one or several layer(s) of approximately tangentially oriented reinforcing fibers and one or several additional, filled layer(s).

Such pipes have been known, for example, from Austrian Pat. Nos. 304,202 and 323,485. These pipes, produced by the centrifugal molding method, do not exhibit, however, any appreciable proportion of fibers oriented in the axial direction; this causes problems, especially with pipes of relatively small diameters, with respect to axial stress, i.e. when the pipes are placed under bending stress. It has been suggested for solving this problem to utilize fibrous fabrics (fiber mats) for pipe reinforcement, but this brings with it the disadvantage that the centrifugal molding process for pipe manufacture can no longer be readily utilized since the reinforcement must be wound up and can only be introduced in the pipe mold by unwinding. This also holds true for the pipe known from DOS No. 2,842,530, which can be seen from the fact that the glass fibers in this conventional pipe are oriented in the two pipe layers inclined at 80°–88° and 2°–10°, respectively, with regard to the pipe axis. An orientation under 90° or 0°, respectively, with regard to the pipe axis cannot be attained, as is known, by the winding method.

DOS No. 2,726,499 discloses a pipe built up of several layers including, inter alia, layers with glass fiber pieces oriented in the peripheral direction, i.e. tangentially, and layers with randomly oriented glass fiber pieces. Layers containing axially parallel oriented fiber sections are not included in this conventional pipe.

DOS No. 3,133,091 describes a shrink-molded component with axially parallel, "bundled single filaments", i.e. continuous fibers, which cannot be compared to cut fibers and serve for preventing axial shrinkage of the molded part. No tangentially oriented fibers (fiber sections) are provided since these would preclude radial shrinkage of the molded part disclosed in DOS No. 3,133, 091.

The axially oriented fibers known from French Laid-Open Application No. 2,310,517 as a constituent of a pipe are not cut fibers and are present partly in the form of continuous carbon fibers and partly in the form of glass fiber fabrics.

Accordingly, the invention is based on the object of providing a pipe of the type discussed above which, even with smaller diameters, is adequately resistant to loads acting in the axial direction.

This object has been attained according to this invention by providing that the pipe exhibits, in one or several additional layer(s), a fiber reinforcement, the cut fibers of which are aligned approximately in parallel to the longitudinal axis of the pipe.

Due to the fact that, in the pipe of this invention, besides the layer wherein tangentially oriented, cut reinforcement fibers are contained, there is arranged at least one layer wherein the cut reinforcement fibers are aligned approximately in parallel to the longitudinal axis of the pipe, i.e. approximately axially, the surprising advantage is achieved that the total proportion of fibers can be reduced without a change in strength with respect to tangential and axial stresses. This results simply from the feature that, in the pipe of this invention, the fiber reinforcement is purposely oriented in the directions desired, so that even with a lower total proportion of fibers, the desired strength values can be attained.

The invention is especially suited for pipes having a diameter of up to 600 mm, preferably a diameter of 150–400 m.

According to this invention, the tangential-axial strength ratio is selected preferably so that it is 5:3 in the layer reinforced with tangentially oriented fibers and that with axially parallel oriented fibers.

Advantageously, the provision can be made within the scope of this invention to arrange the layer(s) of the pipe containing axially parallel oriented fibers indirectly or directly between two layers containing tangentially oriented fibers. This stratified construction of the pipe of this invention can be obtained in an especially simple way by the centrifugal molding method and results in particularly rugged pipes.

It is also possible to provide in the pipe of this invention several mutually separate layers with axially parallel and/or tangentially oriented fibers. It is preferred in this case to provide, outside of the layer containing axially parallel oriented fibers, and separated from the latter by a layer with tangentially oriented fibers, a layer containing axially parallel oriented fibers and another layer containing a filler, such as sand or the like.

The invention relates to a process for producing the fiber-reinforced pipes according to this invention of a hardenable synthetic resin by the centrifugal molding method wherein the fibers and the synthetic resin as well as optionally other fillers contained in the pipe wall are fed to a horizontally rotatable mold in axially parallel direction thereto, the fibers being cut, and the cut fibers, especially glass fiber rovings, being introduced into the interior of the rotating mold distributed over the longitudinal direction thereof, and wherein the fibers to be oriented tangentially are deposited in the mold exiting from the feeding device for the fibers oriented tangentially to the pipe wall.

Such centrifugal molding processes have been known from Austrian Pat. Nos. 300,333; 304,202; and 323,485. However, none of the aforementioned processes yields any suggestion how the fiber reinforcement for the fiber-reinforced pipes can be laid in a defined fashion during the centrifugal molding process. This holds true, in particular, for the fiber reinforcement to be aligned axially parallel, since the fiber reinforcement to be oriented tangentially can be introduced simply by means of a distributing device, the free end of which terminates tangentially within the centrifugal mold, pointing into the direction of rotation.

Accordingly, the invention has as its objective to indicate a method making it possible, in particular, to deposit axially oriented reinforcing fibers in a defined manner.

This objective has been attained within the scope of this invention by introducing the fibers contained, in the pipe to be manufactured, with axially parallel orientation into the mold in parallel to the axis of rotation of the mold, and imparting to the fibers, at the depositing site, preferably after decelerating their axial movement, an acceleration oriented transverely to their direction of motion when fed into the mold; and by feeding the fibers into the mold preferably without a change of orientation, i.e. approximately in parallel to the longitudinal axis of the rotatable mold.

It is possible by means of the process of this invention to lay the cut fibers separately in the peripheral or longitudinal direction of the pipe to be manufactured. It is moreover possible to utilize commercially available cut roving when using glass fibers. The laying of the cut fibers oriented in the longitudinal direction (axially) is accomplished without any problems by the process of this invention, due to the fact that the rovings to be deposited axially parallel are accelerated, at the end of the feeding route, only after having been decelerated, in the peripheral direction so that the cut roving is deposited in the centrifugal mold in an axially parallel fashion.

Acceleration of the fibers to be deposited oriented in the axial direction is achieved in an especially safe and reliable fashion if the fibers to be deposited oriented in the axial direction are accelerated, during depositing in the mold, mechanically and/or pneumatically transversely to their feeding direction.

When manufacturing pipes having relatively small diameters, i.e. a diameter below 600 mm, preferably 150–400 mm, according to the process of this invention, then it is recommended, to ensure curing of the synthetic resin, to proceed by preheating the rotatable mold to a temperature of 40°–60° C., especially 50°–55° C., before introducing the thermosetting snythetic resins into the rotatable mold, and by removing the still warm pipe from the rotatable mold, preferably by pulling it out in the direction of the longitudinal axis or axis of rotation, respectively.

Finally, the invention concerns a device for conducting the process of this invention with a rotatable pipe mold as well as a means for feeding the fiber material and the synthetic resin into the tubular mold, this means being connected via a conduit with a distributing unit for the tangentially oriented fiber material and for the synthetic resin. The distributing unit projects into the interior of the rotatable tubular mold, and the tubular mold and the distributing unit are movable relatively to each other in the direction of the rotational or longitudinal axis of the tubular mold. The device of this invention furthermore includes a means for cutting the fiber material.

Such devices for the production of pipes by the centrifugal molding method have been known, for example, from Austrian Pat. Nos. 266,340; 300,333; 304,064; and 327,532. However, none of the conventional devices makes it possible to deposit, in a controlled fashion, fibers oriented in the axial direction of the rotating centrifugal mold.

It is, therefore, another object of this invention to provide a device of the above-discussed type making it possible to manufacture centrifugally molded pipes exhibiting at least one layer with cut reinforcing fibers oriented in the axial direction.

The device of this invention, attaining this object, is distinguished by including a distributing unit for the axially parallel oriented fiber material wherein a preferably cylindrical chamber is connected to the end of the feed conduit—for the axially parallel oriented fiber material—which end projects into the interior of the rotatable pipe mold. A vane that can be driven by a motor and is rotatable about an axis in parallel to the axis of rotation of the pipe mold is arranged in the chamber. Another aspect of this device provides that a disk is arranged which is connected with the vane for rotation therewith, is aligned transversely to the axis of rotation of the vane, and lies in opposition to the orifice of the feed conduit, and that the chamber, on its wall surface, has a discharge opening for the reinforcing fibers.

In the device of this invention, the fibers to be deposited in the axial direction are decelerated by the disk in the chamber adjoining the feed conduit for the fiber material, and are accelerated, by the rapidly revolving vane, transversely to their direction of movement so that they exit under the effect of the occurring centrifugal force, while maintaining their axially parallel orientation, through the discharge opening from the chamber and are deposited in the pipe mold.

The vane provided according to this invention is especially highly effective if the vane rotatably mounted in the chamber is shorter than the chamber and, in its width, corresponds approximately to the chamber diameter, there being a spacing between the end wall of the chamber and the vane.

The provision can be made, along the lines of improving further the movements within the chamber, that the feed conduit for the fiber material terminates in the chamber eccentrically in its end wall, it being preferred that the feed conduit terminate in the end wall of the chamber on the side in opposition to the discharge opening, with respect to its longitudinal axis of symmetry or, respectively, the axis of rotation of the vane.

In order to guide the cut fibers exiting from the chamber also outside of the chamber as long as possible, and to prevent changes in the fiber alignment, it is possible to provide within the scope of this invention that the rearward longitudinal end of the discharge opening, as seen in the direction of the vane rotation, comprises a baffle oriented approximately tangentially to the cylindrical shell of the chamber. In this connection, it is preferred that the baffle is aligned approximately tangentially to the jacket surface of the rotatable pipe mold.

In the device of this invention, it is possible to cut the reinforcing fibers, to be deposited tangentially as well as axially parallel, beforehand in a cutting means arranged outside of the rotatable pipe mold. This entails the advantage that no cutting installations need to be provided within the tubular mold at the distributing means so that also comparatively small pipes can be manufactured.

However, without increasing the space requirement, it is readily possible in the device of this invention to employ the distributing means for the fibers to be deposited in axially parallel orientation also for the cutting of these fibers. This is made possible in a surprisingly simple way by fashioning the edge of the vane adjacent the feed conduit as a cutting blade for cutting the fiber material, especially the glass fiber rovings.

Several examples, which are not limiting, are indicated below for pipes according to this invention, wherein the following symbols will be employed:
DN: nominal size
SN: nominal stiffness
OL: outer cover layer (outliner, pure resin)
GS: axially orientated glass fibers and sand as the filler
GA: axially oriented glass fibers
GT: tangentially oriented glass fibers
DS: inner cover layer (inliner) of an especially elastic and/or chemical-resistant pure resin

EXAMPLE 1

Centrifugally molded pipe DN 150 SN 10,000 PN 1
(Synthetic resin: unsaturated polyester resin)

| | |
|---|---|
| Wall thickness | 4.4 mm |
| Pipe stiffness | 10,099 N/m$^2$ |
| Average flexural modulus | 6,229 N/mm$^2$ |
| Wall stiffness | 44 kN/mm$^2$ |
| Longitudinal tensile strength | 123.7 N/mm |
| Bursting pressure | 42.5 bar |
| Annular tensile strength | 348.3 N/mm |
| Circumferential elongation at 1 bar | 0.01% |

Pipe Structure (from the Outside Toward the Inside)

| | Layer Thickness | Type of Laminate | Glass Fiber Proportion |
|---|---|---|---|
| Layer 1 | 0.3 mm | OL | 0.0% |
| Layer 2 | 0.2 mm | GT | 50.0% |
| Layer 3 | 1.4 mm | GS | 5.0% |
| Layer 4 | 0.0 mm | GT | 50.0% |
| Layer 5 | 0.5 mm | GA | 38.0% |
| Layer 6 | 1.0 mm | GT | 38.0% |
| Layer 7 | 1.0 mm | DS | 0.0% |

Material Required for Layers

| | Resin kg | % | Glass kg | % | Sand kg | % | DS kg | % |
|---|---|---|---|---|---|---|---|---|
| Layer 1 | 0.0 | 0 | 0.0 | 0 | 0.0 | 0 | 1.2 | 100 |
| Layer 2 | 0.5 | 50 | 0.5 | 50 | 0.0 | 0 | 0.0 | 0 |
| Layer 3 | 2.1 | 24 | 0.4 | 5 | 6.4 | 71 | 0.0 | 0 |
| Layer 4 | 0.0 | 50 | 0.0 | 50 | 0.0 | 0 | 0.0 | 0 |
| Layer 5 | 1.5 | 62 | 0.9 | 38 | 0.0 | 0 | 0.0 | 0 |
| Layer 6 | 3.0 | 62 | 1.8 | 38 | 0.0 | 0 | 0.0 | 0 |
| Layer 7 | 0.0 | 0 | 0.0 | 0 | 0.0 | 0 | 3.8 | 100 |

Glass distribution: outside 41%, inside 59%.

EXAMPLE 2

Centrifugally molded pipe DN 200 SN 5,000 PN 6
(Synthetic resin: unsaturated polyester resin)

| | |
|---|---|
| Wall thickness | 4.6 mm |
| Pipe stiffness | 5,227 N/m$^2$ |
| Average flexural modulus | 6,441 N/mm$^2$ |
| Wall stiffness | 52 kN/mm$^2$ |
| Longitudinal tensile strength | 137.1 N/mm |
| Bursting pressure | 33.8 bar |
| Annular tensile strength | 365 N/mm |
| Circumferential enlongation at 6 bar | 0.11% |

Pipe Structure

| | Layer Thickness | Type of Laminate | Glass Fiber Proportion |
|---|---|---|---|
| Layer 1 | 0.3 mm | OL | 0.0% |
| Layer 2 | 0.2 mm | GT | 50.0% |
| Layer 3 | 1.6 mm | GS | 8.0% |
| Layer 4 | 0.0 mm | GT | 50.0% |
| Layer 5 | 0.5 mm | GA | 38.0% |
| Layer 6 | 1.0 mm | GT | 38.0% |
| Layer 7 | 1.0 mm | DS | 0.0% |

Material Required for Layers

| | Resin kg | % | Glass kg | % | Sand kg | % | DS kg | % |
|---|---|---|---|---|---|---|---|---|
| Layer 1 | 0.0 | 0 | 0.0 | 0 | 0.0 | 0 | 1.6 | 100 |
| Layer 2 | 0.7 | 50 | 0.7 | 50 | 0.0 | 0 | 0.0 | 0 |
| Layer 3 | 3.4 | 26 | 1.1 | 8 | 8.8 | 66 | 0.0 | 0 |
| Layer 4 | 0.0 | 50 | 0.0 | 50 | 0.0 | 0 | 0.0 | 0 |
| Layer 5 | 2.0 | 62 | 1.2 | 38 | 0.0 | 0 | 0.0 | 0 |
| Layer 6 | 3.9 | 62 | 2.4 | 38 | 0.0 | 0 | 0.0 | 0 |
| Layer 7 | 0.0 | 0 | 0.0 | 0 | 0.0 | 0 | 5.1 | 100 |

Glass distribution: outside 41%, inside 59%.

EXAMPLE 3

Centrifugally molded pipe DN 250 SN 5,000 PN 10
(Synthetic resin: unsaturated polyester resin)

| | |
|---|---|
| Wall thickness | 5.3 mm |
| Pipe stiffness | 5,203 N/m$^2$ |
| Average flexural modulus | 8,079 N/mm$^2$ |
| Wall stiffness | 101 kN/mm$^2$ |
| Longitudinal tensile strength | 186.8 N/mm |
| Bursting pressure | 49.7 bar |
| Annular tensile strength | 663.9 N/mm |
| Circumferential elongation at 10 bar | 0.18% |

Pipe Structure

| | Layer Thickness | Type of Laminate | Glass Fiber Proportion |
|---|---|---|---|
| Layer 1 | 0.3 mm | OL | 0.0% |
| Layer 2 | 1.2 mm | GT | 50.0% |
| Layer 3 | 1.3 mm | GS | 10.0% |
| Layer 4 | 0.0 mm | GT | 50.0% |
| Layer 5 | 0.5 mm | GA | 38.0% |
| Layer 6 | 1.0 mm | GT | 38.0% |
| Layer 7 | 1.0 mm | DS | 0.0% |

Material Required for Layers

| | Resin kg | % | Glass kg | % | Sand kg | % | DS kg | % |
|---|---|---|---|---|---|---|---|---|
| Layer 1 | 0.0 | 0 | 0.0 | 0 | 0.0 | 0 | 2.0 | 100 |
| Layer 2 | 5.2 | 50 | 5.2 | 50 | 0.0 | 0 | 0.0 | 0 |
| Layer 3 | 3.5 | 27 | 1.3 | 10 | 8.3 | 63 | 0.0 | 0 |
| Layer 4 | 0.0 | 50 | 0.0 | 50 | 0.0 | 0 | 0.0 | 0 |
| Layer 5 | 2.4 | 62 | 1.5 | 38 | 0.0 | 0 | 0.0 | 0 |
| Layer 6 | 4.8 | 62 | 3.0 | 38 | 0.0 | 0 | 0.0 | 0 |
| Layer 7 | 0.0 | 0 | 0.0 | 0 | 0.0 | 0 | 6.3 | 100 |

Glass distribution: outside 57%, inside 43%.

EXAMPLE 4

Centrifugally molded pipe DN 250 SN 10,000 PN 32
(Synthetic resin: unsaturated polyester resin)

| | |
|---|---|
| Wall thickness | 8 mm |
| Pipe stiffness | 23,391 N/m$^2$ |
| Average flexural modulus | 10,087 N/mm$^2$ |
| Wall stiffness | 434 kN/mm$^2$ |
| Longitudinal tensile strength | 353.1 N/mm |
| Bursting pressure | 138 bar |
| Annular tensile strength | 1,822 N/mm |
| Circumferential elongation at 32 bar | 0.31% |

Pipe Structure

| | Layer Thickness | Type of Laminate | Glass Fiber Proportion |
|---|---|---|---|
| Layer 1 | 0.3 mm | OL | 0.0% |
| Layer 2 | 5.2 mm | GT | 50.0% |
| Layer 3 | 0.5 mm | GA | 38.0% |
| Layer 4 | 1.0 mm | GT | 38.0% |
| Layer 5 | 1.0 mm | DS | 0.0% |

Material Required for Layers

| | Resin kg | % | Glass kg | % | Sand kg | % | DS kg | % |
|---|---|---|---|---|---|---|---|---|
| Layer 1 | 0.0 | 0 | 0.0 | 0 | 0.0 | 0 | 2.0 | 100 |
| Layer 2 | 22.1 | 50 | 22.1 | 50 | 0.0 | 0 | 0.0 | 0 |
| Layer 3 | 2.4 | 62 | 1.5 | 38 | 0.0 | 0 | 0.0 | 0 |
| Layer 4 | 4.7 | 62 | 2.9 | 38 | 0.0 | 0 | 0.0 | 0 |
| Layer 5 | 0.0 | 0 | 0.0 | 0 | 0.0 | 0 | 6.2 | 100 |

Glass distribution: outside 59%, inside 41%.

EXAMPLE 5

Centrifugally molded pipe DN 300 SN 1,250 PN 1
(Synthetic resin: unsaturated polyester resin)

| | |
|---|---|
| Wall thickness | 4.4 mm |
| Pipe stiffness | 1,348 N/m$^2$ |
| Average flexural modulus | 6,200 N/mm$^2$ |
| Wall stiffness | 44 kN/mm$^2$ |
| Longitudinal tensile strength | 118 N/mm |
| Bursting pressure | 21.3 bar |
| Annular tensile strength | 340.6 N/mm |
| Circumferential elongation at 1 bar | 0.03% |

Pipe Structure

| | Layer Thickness | Type of Laminate | Glass Fiber Proportion |
|---|---|---|---|
| Layer 1 | 0.3 mm | OL | 0.0% |
| Layer 2 | 0.2 mm | GT | 50.0% |
| Layer 3 | 1.4 mm | GS | 3.0% |
| Layer 4 | 0.5 mm | GA | 38.0% |
| Layer 5 | 1.0 mm | GT | 38.0% |
| Layer 6 | 1.0 mm | DS | 0.0% |

Material Required for Layers

| | Resin | | Glass | | Sand | | DS | |
|---|---|---|---|---|---|---|---|---|
| | kg | % | kg | % | kg | % | kg | % |
| Layer 1 | 0.0 | 0 | 0.0 | 0 | 0.0 | 0 | 2.3 | 100 |
| Layer 2 | 1.0 | 50 | 1.0 | 50 | 0.0 | 0 | 0.0 | 0 |
| Layer 3 | 4.0 | 23 | 0.5 | 3 | 13.0 | 74.0 | 0.0 | 0 |
| Layer 4 | 2.9 | 62 | 1.8 | 38 | 0.0 | 0.0 | 0.0 | 0 |
| Layer 5 | 5.8 | 62 | 3.6 | 38 | 0.0 | 0.0 | 0.0 | 0 |
| Layer 6 | 0.0 | 0 | 0.0 | 0 | 0.0 | 0 | 7.6 | 100 |

Glass distribution: outside 38%, inside 62%.

EXAMPLE 6

Centrifugally molded pipe DN 350 SN 10,000 PN 20
(Synthetic resin: unsaturated polyester resin)

| | |
|---|---|
| Wall thickness | 8.5 mm |
| Pipe stiffness | 10,210 N/m$^2$ |
| Average flexural modulus | 9.902 N/mm$^2$ |
| Wall stiffness | 511 kN/mm$^2$ |
| Longitudinal tensile strength | 357 N/mm |
| Bursting pressure | 91.6 bar |
| Annular tensile strength | 1,683.3 N/mm |
| Circumferential elongation at 20 bar | 0.27% |

Pipe Structure

| | Layer Thickness | Type of Laminate | Glass Fiber Proportion |
|---|---|---|---|
| Layer 1 | 0.3 mm | OL | 0.0% |
| Layer 2 | 4.6 mm | GT | 50.0% |
| Layer 3 | 1.1 mm | GS | 12.0% |
| Layer 4 | 0.0 mm | GT | 50.0% |
| Layer 5 | 0.5 mm | GA | 38.0% |
| Layer 6 | 1.0 mm | GT | 38.0% |
| Layer 7 | 1.0 mm | DS | 0.0% |

Material Required for Layers

| | Resin | | Glass | | Sand | | DS | |
|---|---|---|---|---|---|---|---|---|
| | kg | % | kg | % | kg | % | kg | % |
| Layer 1 | 0.0 | 0 | 0.0 | 0 | 0.0 | 0 | 2.7 | 100 |
| Layer 2 | 27.2 | 50 | 27.2 | 50 | 0.0 | 0 | 0.0 | 0 |
| Layer 3 | 4.2 | 28 | 1.8 | 12 | 9.0 | 60 | 0.0 | 0 |
| Layer 4 | 0.0 | 50 | 0.0 | 50 | 0.0 | 0 | 0.0 | 0 |
| Layer 5 | 3.3 | 62 | 2.0 | 38 | 0.0 | 0 | 0.0 | 0 |
| Layer 6 | 6.6 | 62 | 4.1 | 38 | 0.0 | 0 | 0.0 | 0 |
| Layer 7 | 0.0 | 0 | 0.0 | 0 | 0.0 | 0 | 8.6 | 100 |

Glass distribution: outside 66%, 34%.

The device according to this invention for the production of centrifugally molded pipes can have an extensively arbitrary basic structure, except for the distributing unit for the axially oriented fibers, and thus can be constructed as disclosed in the aforementioned patents. Consequently, the following description addresses itself in detail only to the distributing unit for axially to be oriented fiber material, arranged in the rotatable pipe mold, referring to the appended drawings wherein:

FIG. 2 shows the arrangement of the distributing unit of FIG. 1 in a pipe mold.

Figure 1:
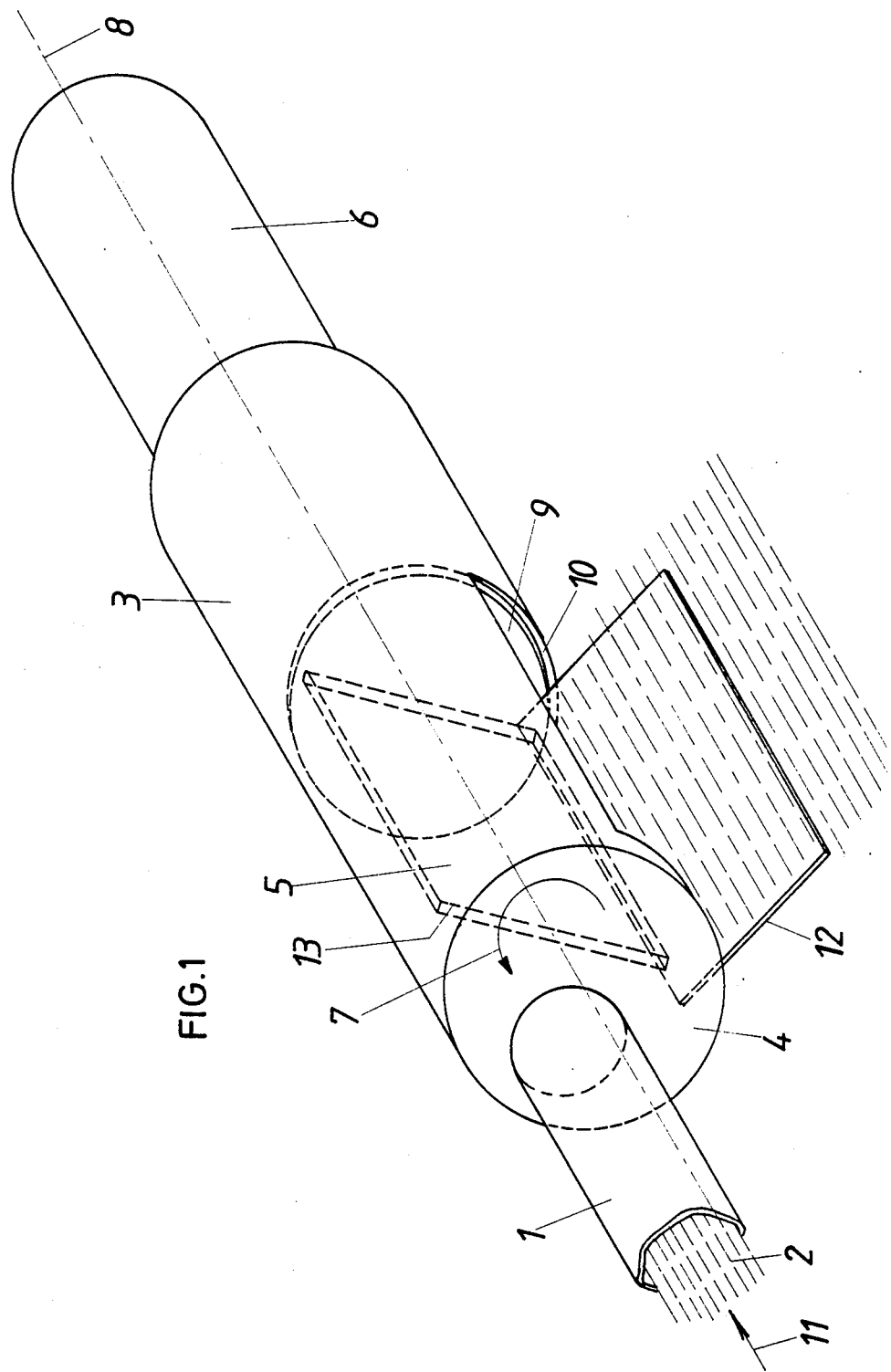
FIG. 1 shows a distributing unit for axially oriented fibers.

A cylindrical chamber 3, aligned axially in parallel to the pipe axis 16, is provided (compare FIG. 1) at the end of a feed conduit 1 for fiber material 2, for example glass fiber rovings, this end being accommodated in the interior of the pipe mold 14 rotatable about the axis 16 for the production of a pipe 15 by the centrifugal molding method (see FIG. 2). The feed conduit 1 is connected to the end wall 4 of the chamber 3 offset with respect to the longitudinal axis of symmetry 8 of the chamber 3, i.e. in an eccentric fashion.

A vane 5 is provided in the chamber 3; this vane can be set into rapid rotation (about 3,000 rpm) in the direction of arrow 7 by a schematically indicated motor 6. The axis of rotation of the vane 5 is congruent with the longitudinal axis 8 of the chamber 3.

On the side opposing the termination of conduit 1, the vane 5 is connected for rotation with a circular disk 9. This disk 9 serves for stopping the longitudinal motion of the glass fibers 2 fed to the device.

A discharge opening 10 is provided in the wall surface of the chamber 3, from which the introduced glass fiber material 2, accelerated by the revolving vane 5 transversely to its feeding direction 11, exits from the chamber 3; as indicated in the drawing, the cut glass fibers remain oriented in the direction of axis 8, which is parallel to the axis of rotation 16 of the revolving pipe mold 14. In order to enhance the guidance of the glass fibers exiting from the discharge opening 10, a baffle 12 is attached to the chamber 3. The baffle 12 extends essentially tangentially to the wall surface of the chamber 3 and preferably also to the shell surface of the rotating pipe mold 14.

As set out above, already cut glass fiber rovings or other reinforcing fibers can be introduced via the conduit 1. However, it is also possible to utilize the vane 5 for cutting uncut introduced glass fiber rovings. In this case, the edge 13 of the vane 5, facing the end of the feed conduit 1 and/or the end face 4 of the chamber 3 and extending transversely to the axis 8, is designed as a cutting blade and cuts the fibers fed into the chamber 3 from conduit 1 into fiber sections of the desired length.

The edge 13 of the vane 5 facing the end wall 4 of the chamber 3 is advantageously arranged at a spacing from the end wall 4.

I claim:

1. In a method for the production of fiber-reinforced pipes of hardenable synthetic resin by a centrifugal molding method, wherein the fibers and the synthetic resin are fed to a horizontally rotatable mold in axially parallel direction thereto and the fibers are introduced into the interior of the rotating mold and are distributed about the side walls of the mold and along the longitudinal length of the mold; the improvement comprising imparting to the fibers within the mold an acceleration oriented transversely to their direction of movement during introduction into the mold while maintaining the orientation of the fibers parallel to the axis of the mold.

2. A method as claimed in claim 1, in which said acceleration is imparted to the fibers by contacting the fibers with a rotatable vane in the mold, whose surface in contact with the fibers is parallel to said axis.

3. A process as claimed in claim 1, and preheating said mold to a temperature of 40°–60° C.

4. In an apparatus for producing fiber-reinforced pipes of a hardenable synthetic resin, comprising a rotatable pipe mold, and means to introduce into the interior of the mold fibers oriented parallel to the axis of rotation of the mold; the improvement comprising a vane disposed within the mold and rotatable about an axis parallel to the axis of rotation of the mold, the vane having a surface contacting the fibers to accelerate the fibers against an internal side wall of the mold, said surface being parallel to said axes thereby to maintain the orientation of the fibers parallel to said axes.

5. Apparatus as claimed in claim 4, said introducing means for said fibers terminating within the mold in a cylindrical chamber having an outlet, said vane rotating in said cylindrical chamber about the axis of the cylindrical chamber and having a width about equal to the internal diameter of the chamber.

6. Apparatus as claimed in claim 5, said introducing means comprising a supply conduit for fibers, that empties into said chamber eccentrically of the chamber, there being a discharge opening for fibers impelled by the vane, on the opposite side of the chamber from said supply conduit.

7. Apparatus as claimed in claim 6, and a baffle on one side of said outlet tangential to said chamber and extending in the same direction as fibers discharged from the chamber.

8. Apparatus as claimed in claim 6, the vane having an edge adjacent said supply conduit which is fashioned as a cutting blade for cutting off fibers entering the chamber.

* * * * *